(12) United States Patent
Thompson et al.

(10) Patent No.: US 8,478,712 B2
(45) Date of Patent: Jul. 2, 2013

(54) METHOD AND APPARATUS TO FACILITATE USING A HIERARCHICAL TASK MODEL WITH RESPECT TO CORRESPONDING END USERS

(75) Inventors: William K. Thompson, Evanston, IL (US); Paul C. Davis, Arlington Heights, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 909 days.

(21) Appl. No.: 12/274,941

(22) Filed: Nov. 20, 2008

(65) Prior Publication Data

US 2010/0125543 A1    May 20, 2010

(51) Int. Cl.
- *G06F 15/00* (2006.01)
- *G06F 15/18* (2006.01)
- *G06Q 10/00* (2012.01)

(52) U.S. Cl.
USPC ............................................ 706/62; 705/7.27

(58) Field of Classification Search
USPC ........................................ 706/62; 705/11.27
See application file for complete search history.

(56) References Cited

U.S. PATENT DOCUMENTS

| | | | |
|---|---|---|---|
| 5,181,250 A | 1/1993 | Morgan et al. | |
| 5,748,841 A | 5/1998 | Morin et al. | |
| 5,878,274 A | 3/1999 | Kono et al. | |
| 6,912,581 B2 | 6/2005 | Johnson et al. | |
| 6,947,885 B2 | 9/2005 | Bangalore et al. | |
| 6,948,129 B1 | 9/2005 | Loghmani | |
| 7,069,215 B1 | 6/2006 | Bangalore et al. | |
| 7,149,983 B1 | 12/2006 | Robertson et al. | |
| 7,162,699 B1 | 1/2007 | Peña Mora et al. | |
| 7,266,499 B2 | 9/2007 | Surace et al. | |
| 2003/0004774 A1 | 1/2003 | Greene et al. | |
| 2003/0033194 A1 | 2/2003 | Ferguson et al. | |
| 2003/0177205 A1* | 9/2003 | Liang et al. | ................... 709/220 |
| 2004/0111284 A1 | 6/2004 | Uijttenbroek | |
| 2004/0117046 A1 | 6/2004 | Colle et al. | |

(Continued)

FOREIGN PATENT DOCUMENTS

WO   2006/023191 A1   3/2006

OTHER PUBLICATIONS

Bong Ser Park, "Corresponding Application PCT/US2009/061994—PCT International Search Report and Written Opinion," WIPO, ISA/KR, Korean Intellectual Property Office, Daejeon, Republic of Korea, Jun. 15, 2010, 11 pages, most relevant pp. 6-7 and 10-11.

(Continued)

*Primary Examiner* — Kakali Chaki
*Assistant Examiner* — Vincent Gonzales

(57) ABSTRACT

One automatically accesses (101) a hierarchical task model as corresponds to a particular task to be executed by a given end user to thereby identify one or more presently un-executed agenda elements. One also automatically accesses (102) characterizing information for that given end user. (By one approach, for example, this characterizing information can comprise information regarding the given end user's knowledge.) This information regarding the un-executed agenda elements and the characterizing information are then used (103) to identify a highest hierarchical level within the hierarchical task model as corresponds to the given end user's wherewithal to successfully execute without also needing lower hierarchical level content within the hierarchical task model. The identified highest hierarchical level within the hierarchical task model is then used (104) to generate a presentation to present to the given end user to thereby facilitate execution of the particular task by the given end user.

12 Claims, 5 Drawing Sheets

U.S. PATENT DOCUMENTS

| | | | |
|---|---|---|---|
| 2005/0138566 | A1 | 6/2005 | Muller et al. |
| 2005/0159968 | A1 | 7/2005 | Cozzolino |
| 2005/0234705 | A1 | 10/2005 | Humphreys et al. |
| 2005/0278467 | A1 | 12/2005 | Gupta et al. |
| 2006/0050865 | A1* | 3/2006 | Kortum et al. ........... 379/265.07 |
| 2006/0053043 | A1 | 3/2006 | Clarke |
| 2007/0073734 | A1* | 3/2007 | Doan et al. .................... 707/100 |
| 2007/0185701 | A1 | 8/2007 | Faure et al. |
| 2008/0183545 | A1 | 7/2008 | Deitrich et al. |
| 2008/0235066 | A1 | 9/2008 | Mano |
| 2008/0235164 | A1 | 9/2008 | Tian et al. |
| 2009/0254336 | A1 | 10/2009 | Dumais et al. |
| 2010/0125483 | A1 | 5/2010 | Davis et al. |

OTHER PUBLICATIONS

Allen et al., "An Architecture for a Generic Dialogue Shell," Natural Language Engineering; Mar. 1, 2000; 16 pages.

Braun et al., "Single Authoring for Multi-Device Interfaces," Adjunct Proceedings of the 8th ERCIM Workshop "User Interfaces for All;" (2004), 8 pages.

Dorohonceanu et al., "A Novel Interface for Group Collaboration," Proceedings of the 33rd Hawaii International Conference on System Sciences; (2000), 10 pages.

Duboue et al., "Statistical Acquisition of Content Selection Rules for Natural Language Generation," Proceedings of the 2003 Conference on Emprical Methods in Natural Language Processing; (2003), 8 pages.

Furtado et al., "KnowiXML: A Knowledge-Based System Generating Multiple Abstract User Interfaces in USIXML," Tamodia 2004 Papers; Prague, Czech Republic, Nov. 15-16, 2004; 8 pages.

Reiter et al.,"Knowledge Acquisition for Natural Language Generation," Proceedings of the First International Conference on Natural Language Generation, vol. 14; (2000),8 pages.

Stanciulescu et al., "A Transformational Approach for Multimodal Web User Interfaces Based on UsiXML," ICMI '05, Oct. 4-6, 2005, Trento, Italy; 8 pages.

Vanderdonckt, "A MDA-Compliant Environment for Developing User Interfaces of Information Systems," Proc. of 17th Conf. on Advanced Information Systems Engineering CAiSE'05; (2005); 16 pages.

Vanderdonckt et al., "USIXML: a User Interface Description Language for Specifying Multimodal User Interfaces," Proc. of 17th Conf. on Advanced Information Systems Engineering CAiSE'05; (2005); 7pages.

Zhang et al.,"Dynamic Context-Aware Access Control for Grid Applications," Proceedings of the 4th International Workshop on Grid Computing; (2003), 8 pages.

Silva software (http://www.infrae.com/products/silva/docs/chief_editor/roles_permissions); applicants became aware of this content on or before Feb. 21, 2008; pp. printed from internet on Jan. 9, 2009.

Barthelmess, P. et al., "Distributed Pointing for Multimodal Collaboration over Sketched Diagrams," pp. 10-17.

Colucci, S. et al., "Semantic-based Approach to Task Assignment of Individual Profiles," Journal of Universal Computer Science, 2004, vol. 10, No. 6, pp. 723-731.

Eisenstein, J. et al., "Adapting to Mobile Contexts with User-interface Modeling," Proceedings Third IEEE Workshop on Mobile Computing Systems and Applications, 2000, pp. 83-92.

Gel, E. et al., "Hierarchical cross-training in work-in-process-constrained systems," IIE Transactions, 2007, vol. 39, pp. 125-143.

Luyten, K. et al., "Task Modeling for Ambient Intelligent Environments: Design Support for Situated Task Executions," pp. 87-94.

Reiter, E. and Dale, R., "Building Natural Language Generation Systems," Cambridge University Press, 2000, pp. 30.

Tse, E. et al., "Multimodal Split View Tabletop Interaction Over Existing Applications," pp. 9.

Final Office Action mailed Aug. 10, 2011 in related U.S. Appl. No. 12/274,921, Paul C. Davis, filed Nov. 20, 2008.

Non Final Office Action mailed Feb. 1, 2011 in related U.S. Appl. No. 12/274,921, Paul C. Davis, filed Nov. 20, 2008.

International Preliminary Report on Patentability and Written Opinion for counterpart International Application No. PCT/US2009/061994 mailed on Jun. 3, 2011.

International Preliminary Report on Patentability and Written Opinion for related counterpart International Application No. PCT/US2009/061993 mailed on Jun. 3, 2011.

International Search Report and Written Opinion for related counterpart International Application No. PCT/US2009/061193 mailed on Jun. 4, 2010.

Samaan, K., and Tarpin-Bernard, F., "Task models and Interaction models in a Multiple User Interfaces generation process," Proceedings of the 3rd annual conference on Task models and diagrams, Nov. 15-16, 2009, pp. 137-144.

* cited by examiner

METHOD AND APPARATUS TO FACILITATE USING A HIERARCHICAL TASK MODEL WITH RESPECT TO CORRESPONDING END USERS

RELATED APPLICATION(S)

This application is related to co-pending and co-owned U.S. patent application Ser. No. 12/274,921, entitled METHOD AND APPARATUS TO FACILITATE USING A HIGHEST LEVEL OF A HIERARCHICAL TASK MODEL TO FACILITATE CORRELATING END USER INPUT WITH A CORRESPONDING MEANING and filed on even date herewith, which is incorporated by reference in its entirety herein.

TECHNICAL FIELD

This invention relates generally to task facilitation and to hierarchical models.

BACKGROUND

Task facilitation is known in the art. This generally comprises mechanisms and/or processes that assist with executing a particular task by one or more end users. Hierarchical models are also known in the art. Hierarchical models have contents organized into a tree-like structure. Such hierarchical models are a useful construct and have been used, for example, to model the various steps or sub-tasks that collectively comprise a particular task.

Task facilitation generally presumes and requires an end user interface. This provides a basis for interacting with the end user to permit, for example, receiving instructions or information from the end user that is useful or necessary with respect to executing the task. This also provides a basis for providing content to the end user as pertains to the state of the task execution process, instructions, and so forth. Generally speaking, the use of an end user interface in conjunction with a task facilitation process is a powerful paradigm that can greatly increase efficiency, accuracy, and user satisfaction.

End user interfaces necessarily tend, by design, to accommodate the wherewithal of an expected user group. (As used herein, the expression "wherewithal" will be understood to refer to the ability of a given individual to accomplish a particular activity. This can comprise a reference to that individual's physical abilities as well as their level of experience, their knowledge base, and their cognitive capabilities. This can also comprise a reference to that individual's ready access to non-native resources such as tools, data and information sources, and so forth.) When presumptions regarding the average wherewithal of the anticipated user group are relatively high, this can result in an end user interface that is unduly challenging to an individual having a lesser wherewithal as pertains to the task at hand. On the other hand, when the end user interface is designed to accommodate an individual having a relatively low wherewithal to accomplish the task, the end user interface can be unduly cumbersome, slow, inefficient, and restrictive in the view of end users having a higher relative wherewithal.

Both of these extremes are undesired. Such circumstances can lead to a task facilitation platform that is unusable by some end users and/or that is inefficient (at the least) for other end users.

BRIEF DESCRIPTION OF THE DRAWINGS

The above needs are at least partially met through provision of the method and apparatus to facilitate using a hierarchical task model with respect to corresponding end users described in the following detailed description, particularly when studied in conjunction with the drawings, wherein.

Figure 1:
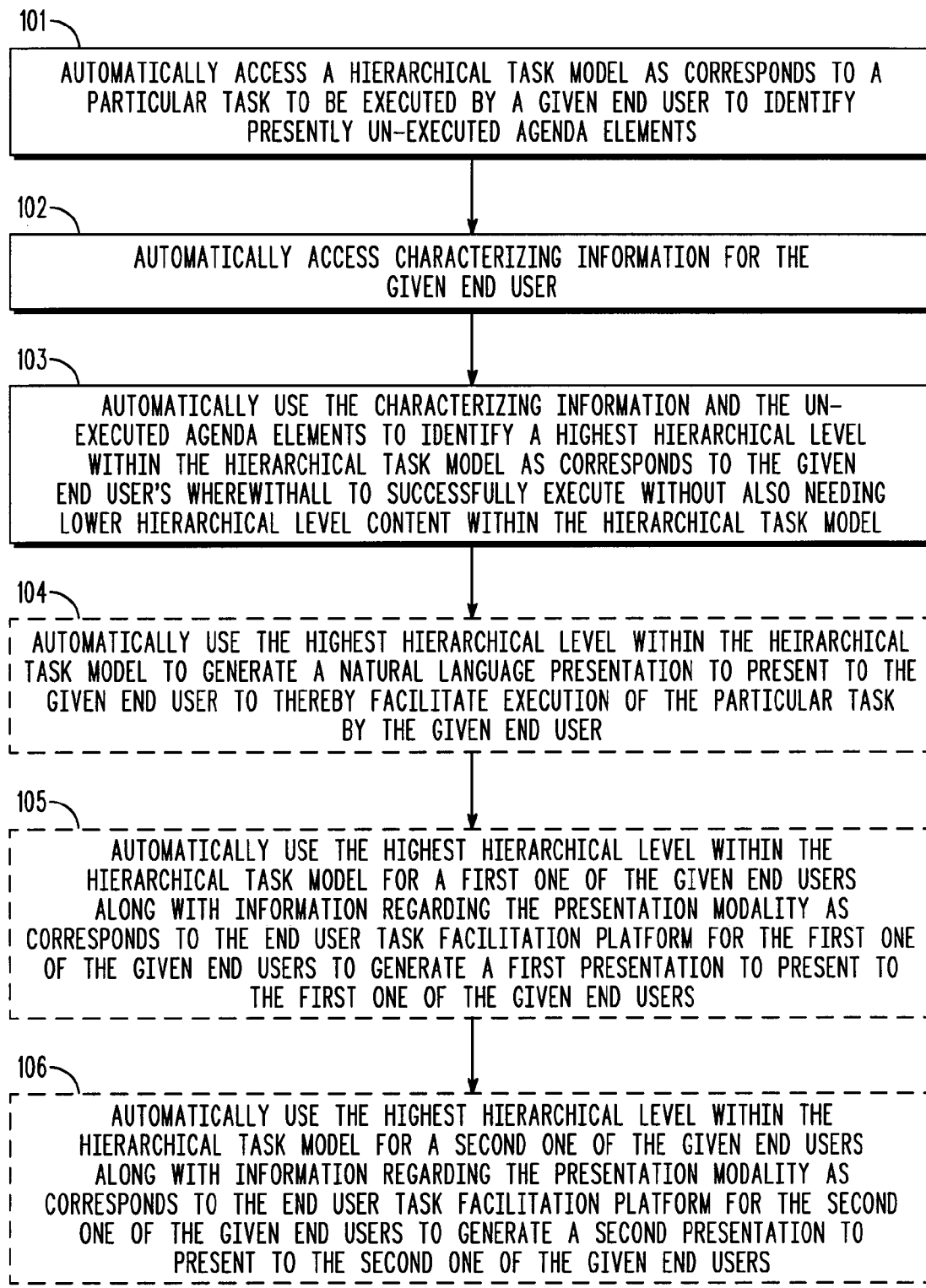
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, one automatically accesses a hierarchical task model as corresponds to a particular task to be executed by a given end user to thereby identify one or more presently un-executed agenda elements. One also automatically accesses characterizing information for that given end user. (By one approach, for example, this characterizing information can comprise information regarding the given end user's knowledge.) This information regarding the un-executed agenda elements and the characterizing information are then used to identify a highest hierarchical level within the hierarchical task model as corresponds to the given end user's wherewithal to successfully execute without also needing lower hierarchical level content within the hierarchical task model.

Put simply, these steps employ a hierarchical task model to facilitate identifying a quantum of information regarding sub-tasks that remain to be taken to complete execution of the task that is not too much information, nor too little information, for this particular end user. This, in turn, can aid in providing that end user with a particular corresponding presentation of such content to thereby facilitate execution of the overall task by this given end user. By one approach, this can comprise generating a natural language presentation of the identified information that is appropriate to the needs and abilities of the targeted end user.

In some application settings a plurality of end users are cooperating (either directly or indirectly and knowingly or unknowingly) with one another to execute an overall task.

This can comprise, for example, different individuals each executing respective corresponding sub-tasks as appropriate to their role, authority, access to information, or the like. The present teachings are readily leveraged in such an application setting to provide some or all of these various end users with a task-facilitation presentation that is appropriate to their individual corresponding wherewithal. So configured, a relative expert can be provided with a relatively high-level presentation while a relatively inexperienced end user can be simultaneously provided with a relatively detailed presentation regarding a same sub-task or result.

It is also possible in some application settings for these various end users to have differing presentation modalities available to present such results. (As used herein, this reference to "modality" will be understood to refer to variations with respect to ways of presenting information as pertain to human perception senses (sight, sound, taste, odor, and touch) and/or as pertain to significant differences in degree with respect to a given way of presenting information (such as, for example, color versus monochromatic displays, large screen high resolution displays versus small screen low resolution displays, and so forth).) In such a case, these present teachings are also readily leveraged to permit accommodating such differences with respect to end user interface modality when presenting the aforementioned hierarchical task model-based information.

Those skilled in the art will recognize and appreciate that these teachings comprise a powerful and readily leveraged approach that will accommodate a wide range of tasks and application setting needs, requirements, and/or opportunities. It will further be recognized that these teachings are highly scalable and can be employed with essentially any number of potential or actual end users. By ensuring that essentially all end users receive task-facilitation information that is appropriate to their respective corresponding wherewithal, these teachings aid in ensuring that all end users are able to successfully complete their task-relevant assignments in a manner that prompts both efficiency as well as accuracy and completeness.

These and other benefits may become clearer upon making a thorough review and study of the following detailed description. Referring now to the drawings, and in particular to FIG. 1, an illustrative process that is compatible with many of these teachings will now be presented.

This process 100 provides the step 101 of automatically accessing a hierarchical task model as corresponds to a particular task to be executed by a given end user to thereby identify presently un-executed agenda elements. As used herein, the expression "agenda elements" will be understood to comprise the discrete steps, actions, or sub-tasks to be undertaken and completed by the given end user which, in the aggregate, constitute the things that need to occur in order to effect the execution of a corresponding task. Agenda elements can include, but are certainly not limited to, data input opportunities or requirements, authorization entry, and any of a wide variety of real-world physical activities, to note but a few examples in this regard. It will be understood by those skilled in the art that these teachings are applicable to a single task which is to be executed by a single given end user and are also applicable to a single task that is to be executed by a plurality of end users as appropriate to the needs and/or opportunities as tend to characterize the application setting.

Figure 2:
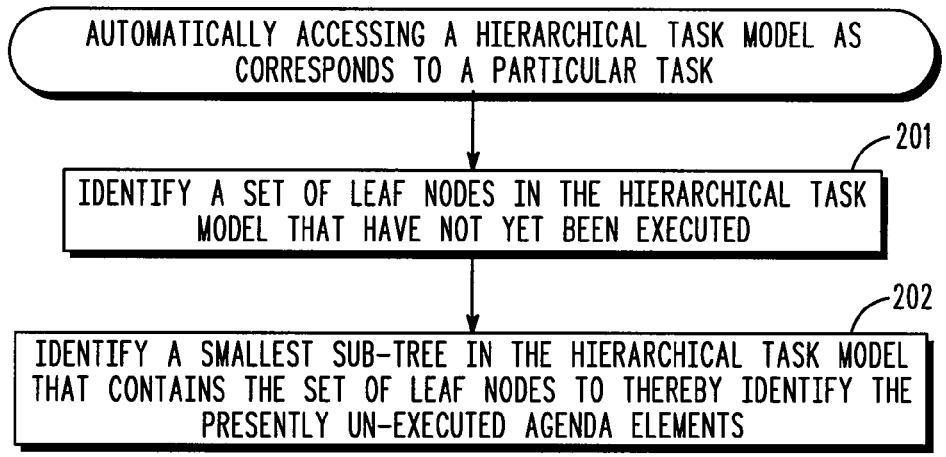
FIG. 2 comprises a flow diagram as configured in accordance with various embodiments of the invention.
Figure 3:
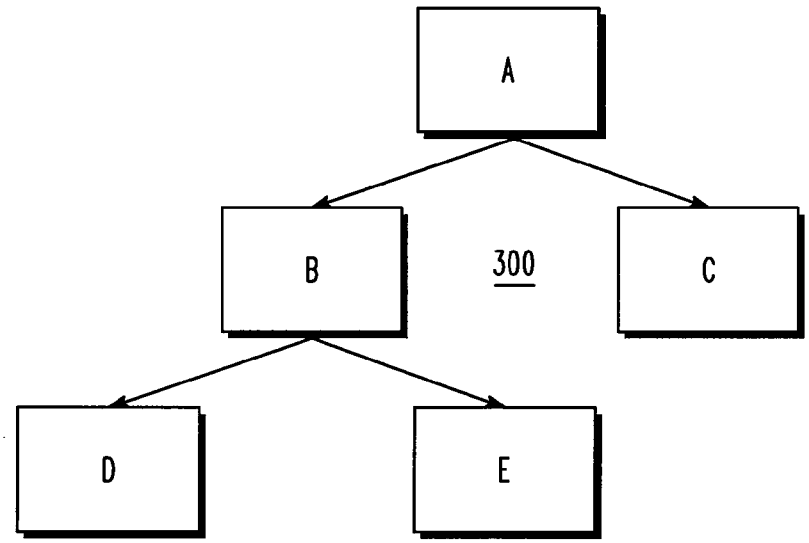
FIG. 3 comprises a schematic representation as configured in accordance with various embodiments of the invention.

This step 101 can be carried out in any of a variety of ways. By one approach, and referring momentarily now to FIG. 2, this step 101 can comprise the step 201 of identifying a set of leaf nodes in the hierarchical task model that have not yet been executed followed by the step 202 of identifying a smallest sub-tree in the hierarchical task model that contains the set of leaf nodes to thereby identify the presently un-executed agenda elements. Referring momentarily to FIG. 3, which provides a greatly simplified illustrative schematic representation of a hierarchical task model 300, when the agenda element(s) represented by leaf node C has already been executed, this might comprise identifying leaf nodes D and E, and their parent node, B, which together comprise the smallest sub-tree containing unexecuted leaf nodes.

This step 101 can be carried out in a manner that corresponds to the limits and/or opportunities of a given application setting. For example, this may comprise accessing a hierarchical task model as stored (in whole or in part) in a local memory (that is, in a memory that comprises a part of a same discrete processing platform as contains, for example, a processor that is effecting this step 101). By another approach, however, this step can comprise accessing a hierarchical task model that is stored in a remote memory. (As used herein, the expression "remote" will be understood to refer to either a significant physical separation (as when two objects are each physically located in discrete, separate, physically separated facilities such as two separate buildings or further) or a significant administrative separation (as when two objects are each administered and controlled by discrete, legally, and operatively separate entities).) Such architecturally-based possibilities are well understood by those skilled in the art and require no further elaboration here.

Referring again to FIG. 1, this process 100 also provides the step 102 of automatically accessing characterizing information for the given end user. Generally speaking, this characterizing information will tend to reflect, directly or indirectly, upon the wherewithal of the given end user to execute the particular task (and/or particular agenda elements as comprise that task). By one approach, for example, this can comprise information regarding the given end user's knowledge (i.e., knowledge that is relevant to the aforementioned task/agenda element execution). This can range from objective information (such as information regarding academic degrees held by the end user, technical training certificates (including both third party and in-house-based recognition), awards, publications, speaking event agendas, number of years in a particular role, and so forth); to subjective information (such as information reflecting supervisory reviews, peer reviews, resumes, and so forth); to self-identification or assessment from a user; or to system inference based on usage patterns and behavior, and so forth.

As with the hierarchical task model itself, this characterizing information can be accessed using a local and/or a remotely located storage media as desired.

As described, these steps can be carried out for a single given end user. When there are a plurality of end users involved with executing the task, these teachings will of course accommodate accessing such information for all of these end users and/or for some selected sub-grouping as desired.

This process 100 then provides the step 103 of automatically using this characterizing information and the information regarding the un-executed agenda elements to identify a highest hierarchical level within the hierarchical task model as corresponds to the given end user's wherewithal to successfully execute without also needing lower hierarchical level content within the hierarchical task model. In effect, to put it perhaps more simply, by this step 103 this process 100 identifies a particular highest level within the hierarchical task model that corresponds to an activity that the end user can accomplish without the benefit of being led through (or informed about) sub-activities that may comprise, or lead up to, this particular activity.

To provide a very simple example in these regards, and without intending any limitations in these regards, consider a task that comprises effecting a purchase of a selected item via a web browser. Pursuant to these teachings, this step 103 might comprise identifying, for a very experienced shopper, a level that corresponds to the generalized task of entering their shipping information. This same step 103, however, for an inexperienced shopper, might identify instead a plurality of levels (lower than the aforementioned level in the hierarchical scheme) that comprise the agenda elements representing the atomic sub-tasks of the generalized task of entering such shipping information. These atomic sub-tasks might comprise, for example, "Enter Your Street Address," "Enter Your City," "Enter Your State," "Enter Your Postal Code," and so forth.

This resultant information can then be used as desired. For example, by one optional approach, these teachings will accommodate the step 104 of automatically using this identified highest hierarchical level within the hierarchical task model to generate a natural language presentation to present to the given end user to thereby facilitate execution of the particular task by the given end user. (The generation of natural language presentations using a given body of substantive content comprises a well understood area of endeavor. As the present teachings are not overly sensitive to the selection of any particular approach in these regards, for the sake of brevity further elaboration or description in these regards will not be provided here.)

Figure 4:
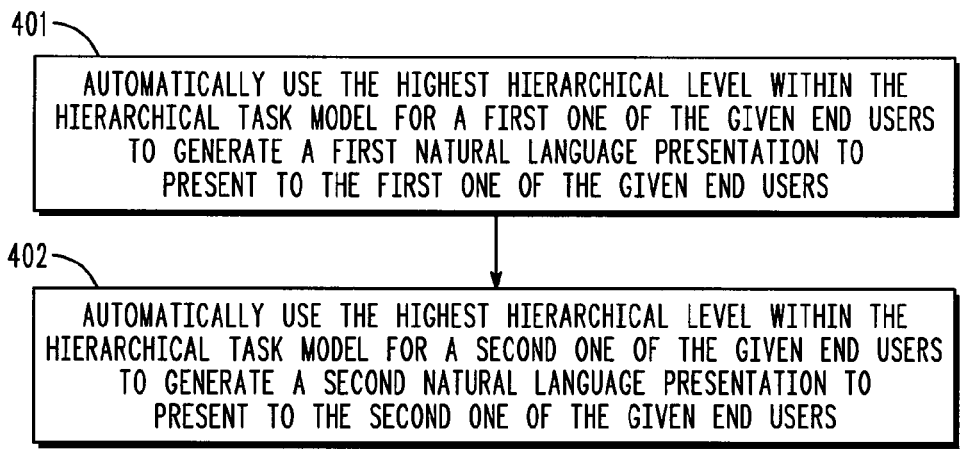
FIG. 4 comprises a flow diagram as configured in accordance with various embodiments of the invention.

As noted earlier, these teachings will readily accommodate accessing the aforementioned information for a plurality of end users who may be jointly executing the task at issue. In such a case, and referring now momentarily to FIG. 4, this step 104 of automatically using the identified level to generate a natural language presentation can comprise, for example, the step 401 of automatically using the highest hierarchical level within the hierarchical task model as has been identified for a first one of the given end users to generate a first natural language presentation to present to this first one of the given end users. This step 104 can also comprise, as illustrated, another step 402 that provides for automatically using the highest hierarchical level as has been identified within the hierarchical task model for a second one of the given end users to generate a second natural language presentation to present to this second one of the given end users. These highest hierarchical levels for each of these two end users may be the same, or may be different from one another, depending upon the characterizing information as corresponds to each of these end users.

It will be understood, of course, that these natural language presentations can vary from one another even when presenting information that is intended, ultimately, to be substantively similar to these two different individuals. These natural language presentations can differ from one another, for example, to reflect differences in the level of content that is to be provided to each individual, respectively.

As noted, these teachings are able to take into account any of a variety of characteristics of given end users as pertain to their wherewithal to execute a given task and/or its constituent agenda elements and to use that information in conjunction with a corresponding hierarchical task model to generate a corresponding presentation for those end users that is highly appropriate on an individual basis for those individuals. Those skilled in the art will recognize, however, that other differences may be in play in a given application setting. As one particular example in this regard, the task facilitation platforms being employed by some (or each) of a plurality of end users who are working together to execute a task may use differing presentation modalities. By one approach, the present teachings are also able to readily account for such presentation modality differences.

Figure 5:
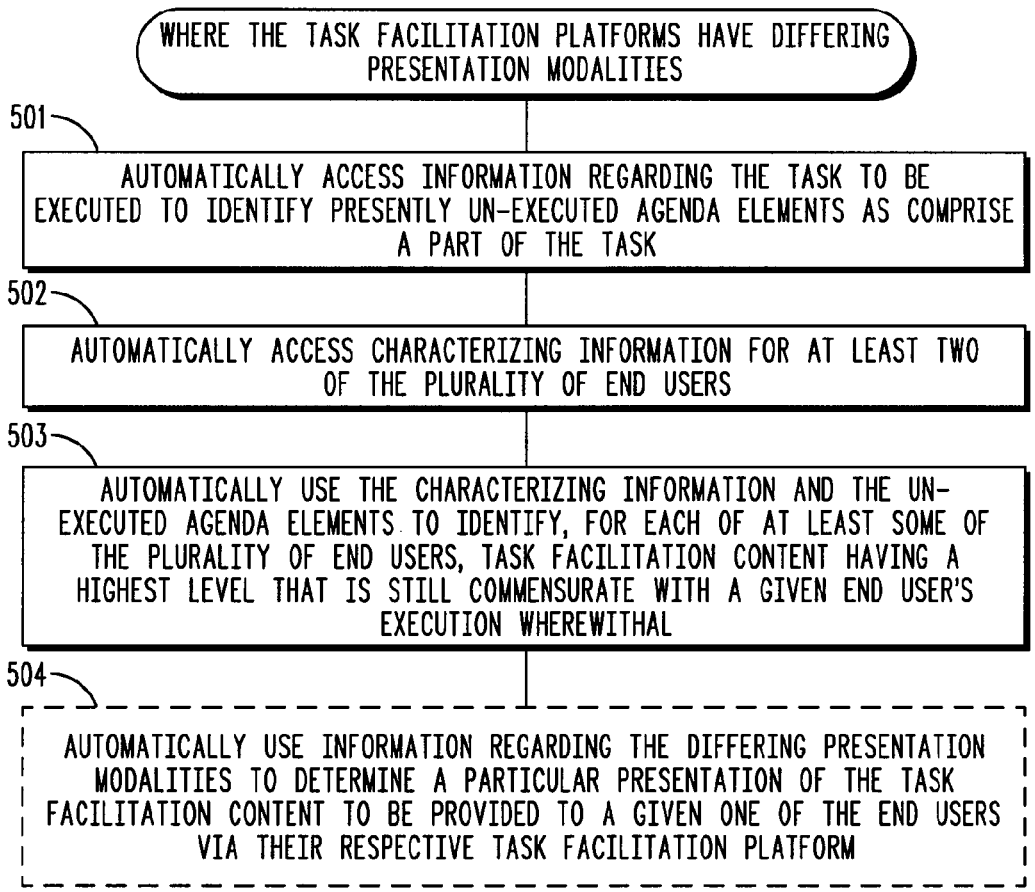
FIG. 5 comprises a flow diagram as configured in accordance with various embodiments of the invention.

As a general illustrative example in this regard, and referring momentarily to FIG. 5, a corresponding process 500 can provide the step 501 of automatically accessing information regarding the task to be executed to thereby identify presently un-executed agenda elements as comprise a part of that task as well as the step 502 of automatically accessing characterizing information for at least two of this plurality of end users. This process 500 then provides the step 503 of automatically using this characterizing information and the information regarding the un-executed agenda elements to identify, for each of the at least some of the plurality of end users, task facilitation content having a highest level that is still commensurate with a given end user's execution wherewithal. This process 500 can then further optionally accommodate the step 504 of automatically using information regarding the aforementioned differing presentation modalities to determine a particular presentation of the task facilitation content to be provided to a given one of the end users via their respective task facilitation platform.

Referring again to FIG. 1, the aforementioned capabilities with respect to the accommodation of differing presentation modalities can also be readily combined with the aforementioned generation of a particular presentation of corresponding content for the end users. This can comprise, for example, including in the previously described process 100 the step 105 of automatically using the highest hierarchical level within the hierarchical task model for a first one of the given end users, along with the aforementioned information regarding the presentation modality as corresponds to the end user task facilitation platform for this particular end user, to generate a first presentation to present to this particular end user. A similar step 106 is also undertaken to accommodate a second such end user. (Those skilled in the art will recognize that essentially any number of end users can be similarly accommodated in this manner and that only two such end users are employed in this example for the sake of illustration and simplicity of explanation.)

So configured, these teachings can be leveraged and employed to provide task-facilitation content to one or more end users that is not only appropriate to their respective wherewithal to execute the task (and/or its constituent sub-tasks) but that is also appropriate to their particular task facilitation platform's presentation capabilities. This, in turn, can permit the presentation content to be of an appropriate modality with respect to the individual platforms being used by such end users.

Figure 6:
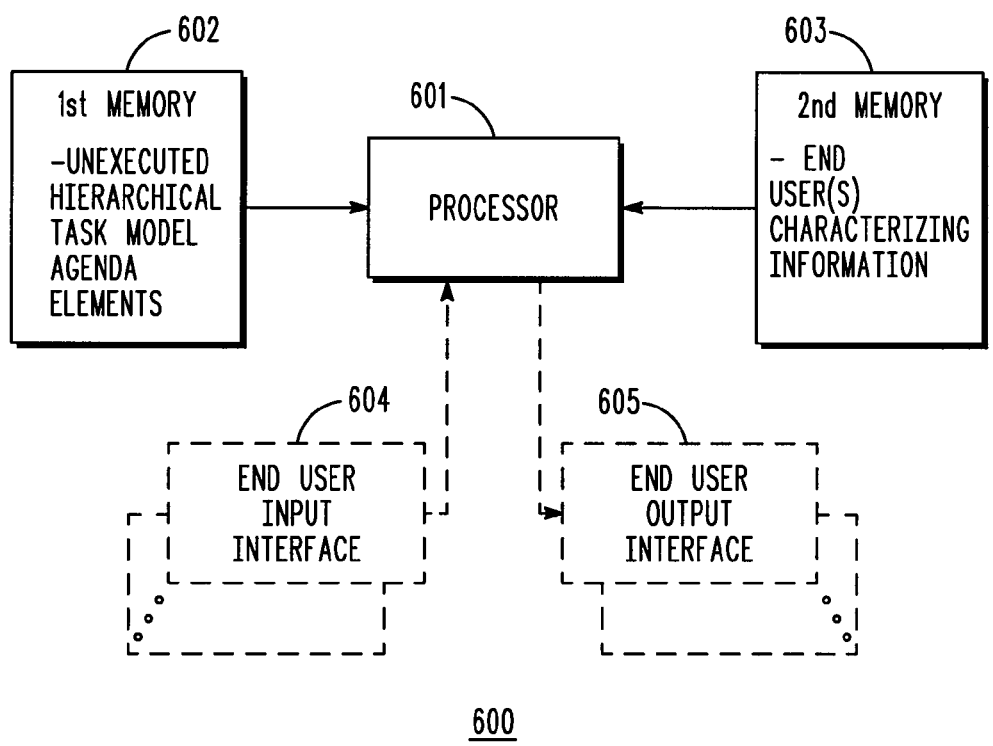
FIG. 6 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 6, an illustrative approach to such a platform will now be provided.

In this illustrative example, the enabling platform comprises a processor 601 that operably couples to a first memory 602 and a second memory 603. This first memory 602 can have the aforementioned information regarding the presently un-executed agenda elements of the aforementioned hierarchical task model as corresponds to a particular task that is to be executed by a given end user stored therein. The second memory 603, in turn, can have the aforementioned characterizing information for this given end user stored therein.

Those skilled in the art will recognize and appreciate that such a processor 601 can comprise a fixed-purpose hard-wired platform or can comprise a partially or wholly programmable platform (such as a microprocessor, a microcontroller, or some other digital computer of choice). All of these architectural options are well known and understood in the art and require no further description here. This processor 601 can be configured (using, for example, corresponding programming as will be well understood by those skilled in the art) to carry out one or more of the steps, actions, and/or functionality as has been described herein. This can comprise, for example, programming the processor 601 to automatically use the characterizing information and the un-executed agenda elements to identify a highest hierarchical level within the hierarchical task model as corresponds to the given end user's wherewithal to successfully execute without also needing lower hierarchical level content within the hierarchical task model. This can further comprise, as desired, automatically using this highest hierarchical level to generate a presentation (such as a natural language presentation) to present to this given end user to thereby facilitate execution of the particular task by this end user. This can also comprise taking into account the presentation modality characteristics of the end user's task facilitation platform when formulating such a presentation.

To further assist in these regards, this platform 600 can further comprise, if desired, one or more end user input interfaces 604 and/or one or more end user output interfaces 605. Those skilled in the art will recognize that these interfaces can interact with end user inputs and/or outputs that are local to the platform 600 itself or that are remote thereto.

Those skilled in the art will recognize and understand that such an apparatus 600 may be comprised of a plurality of physically distinct elements as is suggested by the illustration shown in FIG. 6. It is also possible, however, to view this illustration as comprising a logical view, in which case one or more of these elements can be enabled and realized via a shared platform. It will also be understood that such a shared platform may comprise a wholly or at least partially programmable platform as are known in the art.

Figure 7:
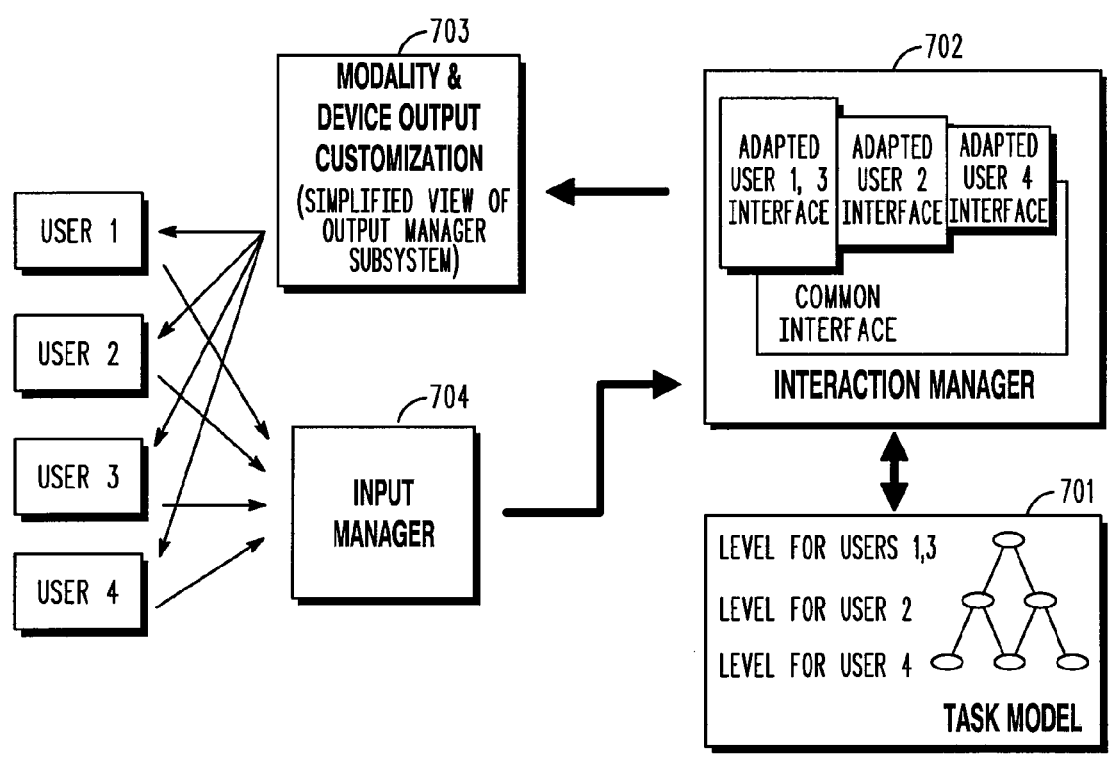
FIG. 7 comprises a block diagram as configured in accordance with various embodiments of the invention.

Referring now to FIG. 7, a somewhat more detailed description of an apparatus that comports with these teachings will be provided. In this particular illustrative example, the apparatus 700 is operating in conjunction with four different users (User 1 through User 4), where at least two of these users have differing levels of wherewithal to execute a given task to which all are dedicated to executing. As per these teachings, an assessment of these different levels of wherewithal in conjunction with the use of a hierarchical task model for the task to be executed yields an identification of which levels within that task model are appropriate to each such individual at any given moment during the execution of the task. This identification information is contained in a memory 701 and, in this case, indicates that User 1 and User 3, having a relatively higher level of wherewithal, are associated with a relatively high level within that task model, while User 2 (having a medium level of wherewithal) is associated with a medium task model level and User 4 (having a lowest level of wherewithal) is associated with a lowest relative level within that task model.

In this illustrative example, an interaction manager 702 uses the aforementioned information to determine the substance of a presentation to be offered to each of these four users. For example, Users 1 and 3, having been associated with a relatively high level in the task model, can be provided with relatively high level content as corresponds to this level. Meanwhile, User 4, who was associated with a relatively low level in the task model, can be provided with a correspondingly greater amount of task-facilitation content. This can vary with the application setting and the task, of course, with examples comprising a presentation of a greater quantity of explanatory material and/or a presentation of a series of sub-tasks that essentially walk this end user, step by step, through the individual activities that will lead to the accomplishment of this activity. Additionally, parts of the interface that are shared among all users can be optionally stored in a common interface.

This illustrative embodiment also comprises a modality and device customization component 703 that receives the substantive content of the interaction manager 702 and selects a particular rendering of that content to suit the particular presentation modality as corresponds to the task-facilitation platform for each of the users.

This embodiment also includes an input manager 704 that serves to receive the inputs from the various users as they interact with this platform to facilitate the task at issue.

Those skilled in the art will recognize and appreciate that these teachings are readily leveraged to accommodate a wide variety of task-facilitation platforms and processes. These teachings are also highly scalable and can be employed in conjunction with a wide variety and range of tasks including tasks that comprise anything from a relatively small number of constituent sub-tasks to those that require a relatively large number of such sub-tasks. It will also be understood that these teachings will accommodate and support as little or as much granularity as regards the wherewithal characterizations of the end users themselves and/or variations in presentation modality as may be desired to meet the needs and/or opportunities of a given application setting.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   automatically accessing a hierarchical task model as corresponds to a particular task to be executed by a plurality of given end users to identify presently un-executed agenda elements;
   automatically accessing characterizing information for at least two of the plurality of given end users;
   automatically using the characterizing information and the un-executed agenda elements to individually identify a highest hierarchical level within the hierarchical task model as corresponds to an individual wherewithal corresponding respectively to each of the at least two of the plurality of given end users to provide information to facilitate successful execution of the particular task without also needing lower hierarchical level content within the hierarchical task model.

2. The method of claim 1 wherein automatically accessing a hierarchical task model as corresponds to a particular task to be executed by the plurality of given end users to identify presently un-executed agenda elements comprises, at least in part:
   identifying a set of leaf nodes in the hierarchical task model that have not yet been executed;

identifying a smallest sub-tree in the hierarchical task model that contains the set of un-executed leaf nodes to thereby identify the presently un-executed agenda elements.

3. The method of claim 1 wherein the characterizing information for the at least two of the plurality of given end users comprises information regarding the at least two of the plurality of given end users' knowledge.

4. The method of claim 1 further comprising:
automatically using the highest hierarchical level within the hierarchical task model for each of the at least two of the plurality of given end users to generate a natural language presentation to present to the respective given end user to thereby facilitate execution of the particular task by the respective given end user.

5. The method of claim 1 further comprising:
automatically using the highest hierarchical level within the hierarchical task model for a first one of the given end users to generate a first natural language presentation to present to the first one of the given end users;
automatically using the highest hierarchical level within the hierarchical task model for a second one of the given end users to generate a second natural language presentation to present to the second one of the given end users.

6. The method of claim 1 wherein:
automatically accessing a hierarchical task model as corresponds to a particular task to be executed by a plurality of given end users to identify presently un-executed agenda elements, where at least two of the plurality of given end users are using end user task facilitation platforms that differ from one another with respect to at least one presentation modality, to identify presently un-executed agenda elements;
automatically accessing characterizing information for the at least two of the plurality of given end users comprises automatically accessing characterizing information for the at least two of the plurality of given end users;
automatically using the characterizing information and the un-executed agenda elements to identify a highest hierarchical level within the hierarchical task model as corresponds to an individual wherewithal corresponding respectively to each of the at least two of the plurality of given end users to provide information to facilitate successful execution of the particular task without also needing lower hierarchical level content within the hierarchical task model comprises:
automatically using the highest hierarchical level within the hierarchical task model for a first one of the given end users along with information regarding the presentation modality as corresponds to the end user task facilitation platform for the first one of the given end users to generate a first presentation to present to the first one of the given end users;
automatically using the highest hierarchical level within the hierarchical task model for a second one of the given end users along with information regarding the presentation modality as corresponds to the end user task facilitation platform for the second one of the given end users to generate a second presentation to present to the second one of the given end users.

7. An apparatus comprising:
a first memory having stored therein information comprising presently un-executed agenda elements of a hierarchical task model as corresponds to a particular task to be executed by a plurality of given end users;
a second memory having stored therein characterizing information for at least two of the plurality of given end users;
a processor that is operably coupled to the first memory and the second memory and that is configured to automatically use the characterizing information and the un-executed agenda elements to individually identify a highest hierarchical level within the hierarchical task model as corresponds to an individual wherewithal corresponding respectively to each of the at least two of the plurality of given end users to provide information to facilitate successful execution of the particular task without also needing lower hierarchical level content within the hierarchical task model.

8. The apparatus of claim 7 wherein the processor is configured to automatically access the hierarchical task model as corresponds to a particular task to be executed by the plurality of given end users to identify presently un-executed agenda elements by, at least in part:
identifying a set of leaf nodes in the hierarchical task model that have not yet been executed;
identifying a smallest sub-tree in the hierarchical task model that contains the set of un-executed leaf nodes to thereby identify the presently un-executed agenda elements.

9. The apparatus of claim 7 wherein the characterizing information for the at least two of the plurality of given end users comprises information regarding the at least two of the plurality of given end users' knowledge.

10. The apparatus of claim 7 wherein the processor is further configured to:
automatically use the highest hierarchical level within the hierarchical task model for each of the at least two of the plurality of given end users to generate a natural language presentation to present to the respective given end user to thereby facilitate execution of the particular task by the respective given end user.

11. The apparatus of claim 7 wherein the processor is further configured to:
automatically use the highest hierarchical level within the hierarchical task model for a first one of the given end users to generate a first natural language presentation to present to the first one of the given end users;
automatically use the highest hierarchical level within the hierarchical task model for a second one of the given end users to generate a second natural language presentation to present to the second one of the given end users.

12. The apparatus of claim 7 wherein:
the first memory has information stored therein comprising presently un-executed agenda elements for a hierarchical task model as corresponds to a particular task to be executed by a plurality of given end users, where at least two of the plurality of given end users are using end user task facilitation platforms that differ from one another with respect to at least one presentation modality;
the second memory has stored therein characterizing information for at least two of the plurality of given end users;
the processor is configured to:
automatically using the characterizing information and the un-executed agenda elements to individually identify a highest hierarchical level within the hierarchical task model as corresponds to an individual wherewithal corresponding respectively to each of the at least two of the plurality of given end users to provide information to facilitate successful execution of the particular task without also needing lower hierarchical level content within the hierarchical task model;

and wherein the processor is configured to:
- automatically use the highest hierarchical level within the hierarchical task model for a first one of the given end users along with information regarding the presentation modality as corresponds to the end user task facilitation platform for the first one of the given end users to generate a first presentation to present to the first one of the given end users;
- automatically use the highest hierarchical level within the hierarchical task model for a second one of the given end users along with information regarding the presentation modality as corresponds to the end user task facilitation platform for the second one of the given end users to generate a second presentation to present to the second one of the given end users.

* * * * *